United States Patent
Frappier

(10) Patent No.: US 6,742,255 B1
(45) Date of Patent: Jun. 1, 2004

(54) METHOD OF MANUFACTURING CURVEABLE REINFORCEMENT

(75) Inventor: Alain Frappier, Montargis (FR)

(73) Assignee: Hutchinson, Paris (FR)

( * ) Notice: Subject to any disclaimer, the term of this patent is extended or adjusted under 35 U.S.C. 154(b) by 112 days.

(21) Appl. No.: 09/688,599

(22) Filed: Oct. 16, 2000

(30) Foreign Application Priority Data

Oct. 22, 1999 (FR) .............................................. 99 13201

(51) Int. Cl.⁷ .............................................. B21D 53/84
(52) U.S. Cl. ....................... 29/888.3; 29/527.4; 29/557; 428/122; 264/177.2
(58) Field of Search ................ 29/888.3, 446, 29/897, 469.5, 897.1, 897.2, 527.1, 527.2, 557, 527.4, 558, DIG. 47; 428/31, 122, 358; 264/175, 176.1, 177.2, 171.24, 171.26; 156/201, 244.12, 244.25, 270; 277/922

(56) References Cited

U.S. PATENT DOCUMENTS

| | | | | |
|---|---|---|---|---|
| 3,445,915 A | * | 5/1969 | Cuckson et al. ............... | 29/408 |
| 3,825,459 A | | 7/1974 | Taylor | |
| 4,584,150 A | * | 4/1986 | Ballocca ..................... | 264/40.1 |
| 4,656,086 A | * | 4/1987 | Bowers et al. .............. | 428/122 |
| 4,676,856 A | | 6/1987 | Shigeki et al. | |
| 4,731,212 A | * | 3/1988 | Hasegawa .................... | 264/167 |
| 4,830,898 A | * | 5/1989 | Smith ......................... | 428/122 |
| 5,028,460 A | * | 7/1991 | Kimura et al. ................ | 428/31 |
| 5,489,461 A | * | 2/1996 | Iwasa et al. ................. | 428/122 |
| 5,741,573 A | * | 4/1998 | Malm ......................... | 428/122 |
| 6,245,409 B1 | * | 6/2001 | Cook .......................... | 428/122 |

FOREIGN PATENT DOCUMENTS

| | | |
|---|---|---|
| DE | 38 35 211 | 4/1990 |
| DE | 90 14 184 | 12/1990 |

* cited by examiner

*Primary Examiner*—Charles T. Jordan
*Assistant Examiner*—T. Nguyen
(74) *Attorney, Agent, or Firm*—Alston & Bird LLP

(57) ABSTRACT

The invention provides a method of manufacturing curveable reinforcement presenting a pattern comprising solid portions and open portions and intended for use in making a reinforced sealing section member, the method comprising:

a) extruding a bead or preform of thermoplastic material; and
b) calendering the bead or preform of thermoplastic material to impart said pattern thereto.

16 Claims, 5 Drawing Sheets

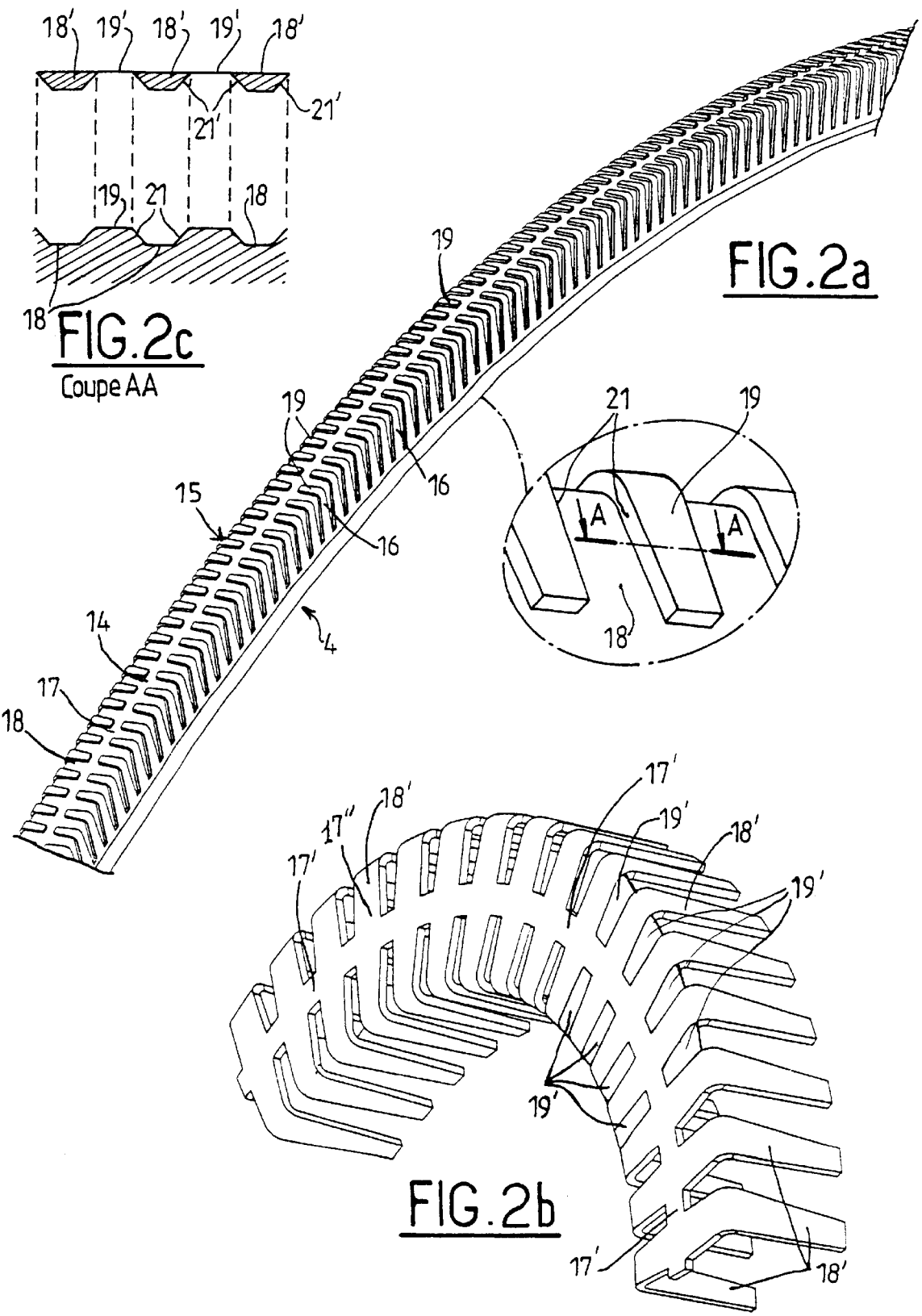

METHOD OF MANUFACTURING CURVEABLE REINFORCEMENT

The present invention relates to a method of manufacturing curveable reinforcement having open regions and intended for reinforcing a section member, in particular for making gaskets for motor vehicles.

BACKGROUND OF THE INVENTION

By way of example, the type of reinforced gasket presently manufactured is made up of:

a) rigid metal reinforcement, e.g. of channel section (cut out from steel or aluminum, or sheared and drawn, or indeed of steel wire with textile);

b) a covering of flexible thermoplastic or rubber; where necessary the reinforcement is treated so as to make it adhere to the covering;

c) fastening lips inside the channel section; and d) a flexible portion that provides sealing, made of flexible or cellular rubber.

The major drawbacks of the method presently in use are as follows:

The metal of the extruded section members must be preformed or post-formed.

The metal oxidizes at the ends of the section member. To avoid oxidation, it is necessary to provide protection. In which case, a stainless metal is used or else varnish is deposited on the portions exposed to oxidation. That significantly increases the price of the finished product.

The finished product is difficult to recycle because it is made up of multiple materials of different kinds (metal, rubber, thermoplastic).

Manufactured metal is expensive, and its cost is even higher if the metal needs to be prepared in order to make it adhere to the covering of rubber or of thermoplastic.

Material is necessarily lost because of the need to make cutouts.

The weight of metal reinforcement is considerable, with the specific gravity of aluminum being 2.7 and of steel being 7.8.

It is necessary to prepare the ends in order to be able to bond them or to overmold them (unhooking, trimming).

OBJECTS AND SUMMARY OF THE INVENTION

At least some of the above drawbacks are avoided by the method of the invention based on the idea of making the reinforcement of out thermoplastic material (whose specific gravity lies in the range 0.9 to 1.4 depending on the material chosen).

The invention thus provides a method of manufacturing curveable reinforcement presenting a pattern comprising solid portions and open portions and intended for use in making a reinforced sealing section member, the method comprising:

a) extruding a bead or preform of thermoplastic material; and b) calendering the bead or preform of thermoplastic material to impart said pattern thereto.

During the calendering, the plastics material is in a fluid or semi-fluid state and presents viscosity which enables it to flow so as to make the solid portions and the open portions of the desired pattern(s). As a result, the reinforcement is obtained without having to perform any cutting out which would imply removing material.

The method may comprise:

c) cooling the calendered bead or preform.

The cooling may be accompanied by a calibration operation.

The curveable reinforcement may present a section that is U-shaped, V-shaped, S-shaped, L-shaped, or W-shaped.

In a first variant, the calendering is performed between at least two wheels, at least one of which presents recessed imprints in the shape of said pattern, which wheels are driven to rotate simultaneously. At least one of the wheels can be cooled internally.

In a preferred variant, the calendering is performed by means of a pulling caterpillar having N pairs of shapes presenting imprints in the shape of said pattern.

Advantageously, the calendering wheels or the drawing caterpillar presents a developed length that is equal to or a multiple of the length L of a section member to be made. This makes it possible in particular to make reinforcement whose pattern presents variations, e.g. in thickness or in the position of the neutral axis as a function of an abscissa $\underline{x}$ taken in the long direction of the reinforcement, $\underline{x}$ varying over the range 0 to L, in order to vary the section and thus at least one of the properties of the reinforcement as a function of said abscissa.

The reinforcement may have end branches with side edges that slope so as to form tapers.

In order to make a reinforced sealing section, the method may comprise:

d) extruding a flexible covering layer of elastomer or of a thermoplastic material to cover the reinforcement.

This extrusion of a covering layer can be performed immediately after calendering and cooling, such that the sealing section is obtained by a continuous process. In a variant, the reinforcement can be stored after manufacture, e.g. on a drum, after which the operation of extruding the covering layer can be performed on a distinct installation.

In the method, the rigid reinforcing material and the material of the flexible cover layer are for example: rigid polyvinyl chloride (PVC) & flexible PVC; polypropylene (PP) & polypropylene-ethylene-propylene diene monomer (PP-EPDM) or styrene-ethylene butadiene-styrene (SEBS); acrylonitrile butadiene styrene (ABS) & SEBS; PVC-ABS & flexible PVC; and polymethyl methacrylate (PMMA) & SEBS.

The method may implement coextrusion of an intermediate layer and of the layer of covering material, the intermediate layer being of a material that is suitable for adhering to the material of the reinforcement and to the flexible covering material between which it is interposed.

By way of example, the intermediate layer may be selected from ethylene vinyl acetate (EVA) copolymers or ethylene-acrylic ester copolymers (EMA EBA).

In a preferred implementation with an intermediate layer, the reinforcement is made of polyamide (PA), the intermediate layer is made of maleic anhydride grafted epoxy (EP), and the flexible covering layer is made of EPDM.

The invention also provides curveable reinforcement having a pattern with solid portions and open portions at least in a dorsal region, wherein the open portions of the dorsal region present web regions that are thin relative to the solid portions and that form bridges between the solid portions of the dorsal region.

Outside the dorsal region, the solid portions of the reinforcement may optionally present branches including reentrant edges.

Finally, the invention provides a section member including reinforcement as defined above.

BRIEF DESCRIPTION OF THE DRAWINGS

Other characteristics and advantages of the invention will appear better on reading the following description, given by way of non-limiting example and with reference to the drawings, in which:

FIG. 2a shows an embodiment of a wheel for making a section member as shown in FIG. 2b using the method of the invention; FIG. 2c is a section on line AA in a detail of FIG. 2a, associated with a "raised" illustration of the reinforcement obtained in this way;

MORE DETAILED DESCRIPTION

The present invention is suitable for making curveable reinforcement for gaskets, in particular reinforcement of U-shaped, V-shaped, S-shaped, L-shaped, or indeed W-shaped section. Such gaskets having a U-shaped or "channel" section are described in particular in above-mentioned patent FR 2 661 972, in patents FR 2 438 536 (Draftex) and FR 2 509 825 (Mesnel), and in patent applications EP 0 252 659 and EP 0 277 425, both in the name of Silent Channel Products.

Figure 1:
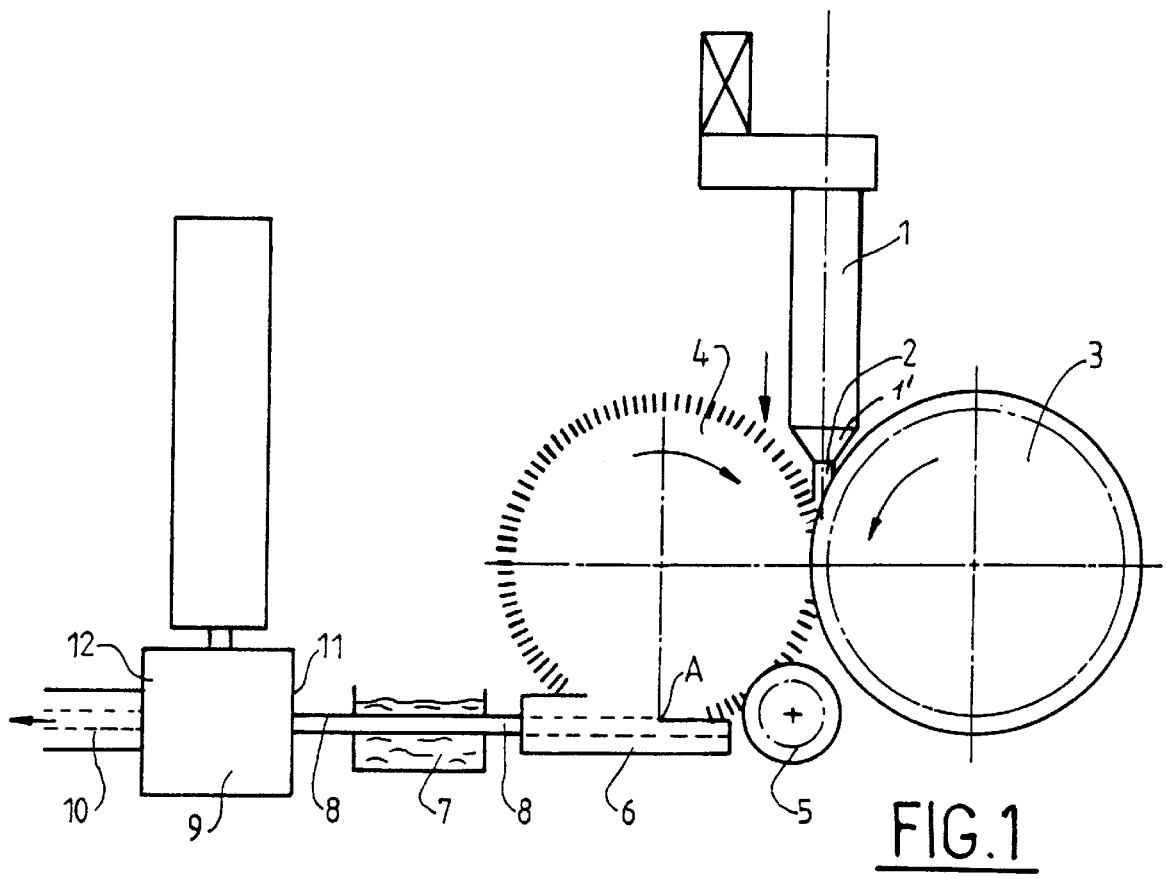
FIG. 1 shows apparatus for implementing the method of the invention.

FIG. 1 shows a thermoplastic extruder 1 which presents in succession: an extrusion head 1' for supplying a bead or preform 2 of molten material of temperature and thus of viscosity selected to enable it to be calendered between a female wheel 3 and a male wheel 4. The apparatus also has a backing wheel 5 for supporting the calendered bead or preform 2, a shaper 6 of conventional kind for calibrating the bead or preform 2 that has been calendered, a cooling bath 7, and a covering extruder presenting an extrusion head 9 which has an upstream end receiving the cooled reinforcement 8 and which produces at its downstream end 12 a section member 10 in which the reinforcement is embedded.

The extruder 1 produces a bead that is flat or cylindrical or indeed a preform having a section that can, for example, be U-shaped, V-shaped, S-shaped, L-shaped, or W-shaped, and that is made of a rigid thermoplastic material.

It is preferable to select plastics materials whose basic nature provides natural adhesion with the flexible covering while making the section member, for example: flexible PVC (covering) on rigid PVC (reinforcement); flexible PVC on ABS; PP-EPDM or EPDM on PP; or indeed SEBS on PP.

The bead of thermoplastic material is deposited between the two wheels (3 and 4) that are rotating together synchronously. The bead is thus calendered so as to obtain the reinforcement, e.g. of channel section. The wheels are preferably of large diameter. A large diameter makes it possible to perform calendering well and improves cooling.

A "male" wheel 4 is etched to form recesses constituting the negative of the pattern to be obtained, while the other wheel 3 is "female" and smooth, e.g. having a channel-section groove, or else it is etched, and it forms a good tangential fit over the wheel 4. The etching on the male wheel 4 is to a specific pattern. It imparts specific properties to the finished section member, making it suitable for complying with the specifications required of the finished product. One example of a male wheel 4 constituted by a metal wheel having a periphery 14 defining a torus of square section or of rectangular section with a pattern in relief 15, which pattern can be made of metal, is shown in FIG. 2a. This wheel serves to make the curveable channel-section reinforcement shown in FIG. 2b (once curved). It presents a central spine 17' and angled ribs 18' which are the counterparts of the spine 17 and the angled ribs 18 formed on the metal wheel of FIG. 2a, themselves situated between the lands 16 of the pattern 15 and having respective angled ends 19.

The central spine 17' and the roots 17" of the ribs 18' constitute a back-bone for the reinforcement.

Around the periphery of the wheels, the pattern is reproduced X times. The calender wheels can be machined by chemical etching, electroerosion, embossing, or milling. As shown in a detail of FIG. 2a and in section on line AA in FIG. 2c, the solid portions or lands 19 of the wheel 4 can have sloping edges 21 forming tapers such that the solid portions or ribs 18' of the reinforcement have reentrant edges 21'. The metal of the wheel is selected from steels that are pretreated or treated after machining. The wheels can be coated in an anti-adhesive agent such as TiN, TiCN, or TiAlN in order to make it easier to separate the reinforcement.

While still molten and of very low viscosity, the plastics material is compressed between the two wheels 3 and 4. It flows and completely fills the recessed etching and it is also pushed by the portions in relief. The particular shapes used for the solid portions and for the open portions of the patterns impart specific properties to the reinforcement.

The reinforcement leaves the two calendering wheels 3 and 4 in the form of an interrupted chain. It is then cooled and calibrated.

After calendering, there remain thin web regions 19' between the ribs 18' (of thickness lying in the range a few hundredths of a millimeter (mm) to 0.1 mm) corresponding to the material that flows naturally over the ends 19 of the lands 16 of the pattern 15.

These web regions 19' are shown only over a portion of the length of the reinforcement. These web regions 19' are easily removed, e.g. by blowing hot compressed air at the outlet from the calender.

Nevertheless, it is particularly advantageous to conserve them. These webs 19' constitute thin bridge regions between the ribs 18'. When the section member is subsequently made by extrusion (or coextrusion) of a covering, e.g. an elastomer or flexible thermoplastic, the material shrinks after extrusion, thereby giving in the finished product to a more or less pronounced visible defect, i.e. a succession of shallow depressions that are usually clearly visible and that are located between the root regions 17" of the ribs 18', running along the spine of the gasket. The presence of the webs 19' tends to avoid this shrinkage phenomenon, thus making it possible to reduce or even eliminate the phenomenon which applies most particularly to the spine which is the most visible region of the gasket. Because they are so thin, the web regions 19' do not compromise the ability of the reinforcement to be curved. Furthermore, these webs 19' perform their function duping manufacture before the gasket is used, which means that any damage to these regions 19' while curving the gasket to a small radius of curvature is without consequence on the above-mentioned visible defect since there is no risk of it reappearing if web regions 19' are broken during curving.

The calender could equally well be constructed in a different manner, specifically using a crawler type pulling machine of the "corrugator" type as used for making ringed pipes.

In the context of the present invention, such a machine has N pairs of shapes cut to the shape of the reinforcement that is to be produced. These shapes can be cooled individually. The N top shapes are machined as are the N bottom shapes on the same principles as the calender having two facing wheels, one male and the other female. The tooling is more expensive than when wheels are used, however the reinforcement is produced more quickly since the time spent by the thermoplastic while it is held captive between the shapes or "pads" is longer. This variant also enables web regions to be obtained.

The following operation which is performed at station 9 is extrusion through a T-head to cover the channel-section reinforcement. Various materials can be selected to perform this function: e.g. cellular thermoplastic (TP) for watertightness, skin appearance or color, cosmetic lips, retaining lips on the inside of the channel section.

The finished section member is cooled without any need for post-forming.

A preferred variant of the method of covering the reinforcement is coextrusion of the bead with two thermoplastic materials. This concept makes it possible to obtain adhesion between the reinforcement and its covering material even when they are mutually incompatible. Under such circumstances, the rigid reinforcing material is covered by a thin intermediate layer of a composition that adheres to the covering. This intermediate layer is selected from extrudable materials which are compatible both with the reinforcement and with the subsequent covering and that are suitable for adhering to both of them, grafted EP, acrylic adhesives, or EVA, for example. This makes it possible to comply with various specifications while having a wide range of choice for the various thermoplastic materials of various compositions. An advantageous example is to coextrude an intermediate layer of maleic anhydride grafted ethylene propylene on PA reinforcement to cover it in a flexible covering layer of EPDM.

In order to make it recyclable, the coextruded material also has the function of being compatible with the various thermoplastics materials constituting the section member.

When providing adhesion between a thermoplastic and an elastomer, reference should be made to the teaching of European patent application EP 0 732 384, filed in the name of the Applicant company.

To perform some particular function, the reinforcement can be made to have a section that varies along the developed length of the section member. Changes in the position of the neutral axis at various positions along a gasket for the trunk of a car can make it possible, for example, to enable the gasket to take up successive radii in three dimensions particularly well. A different thickness at specific locations can make it possible to obtain a gasket (e.g. a channel section) that provides varying amounts of clamping along its length. Having open portions of different dimensions can make it possible to curve the gasket to some particular radius. It is also possible to envisage reinforcement that is asymmetrical relative to its axis. To this end, the calendering wheels are made to have a developed diameter that is equal to the length of the section member to be made or to a multiple or submultiple thereof. For example, to make a door gasket with a perimeter of 3.5 meters, the wheels can have a diameter of 1.11 meters. Marking can be performed at the outlet from the die, e.g. by means of an ink jet, synchronously with rotation of the calender so as to identify sequences of variation in reinforcement section. It is thus possible to cut the extrusion to precise lengths, while complying with the required functions.

Figure 3A:
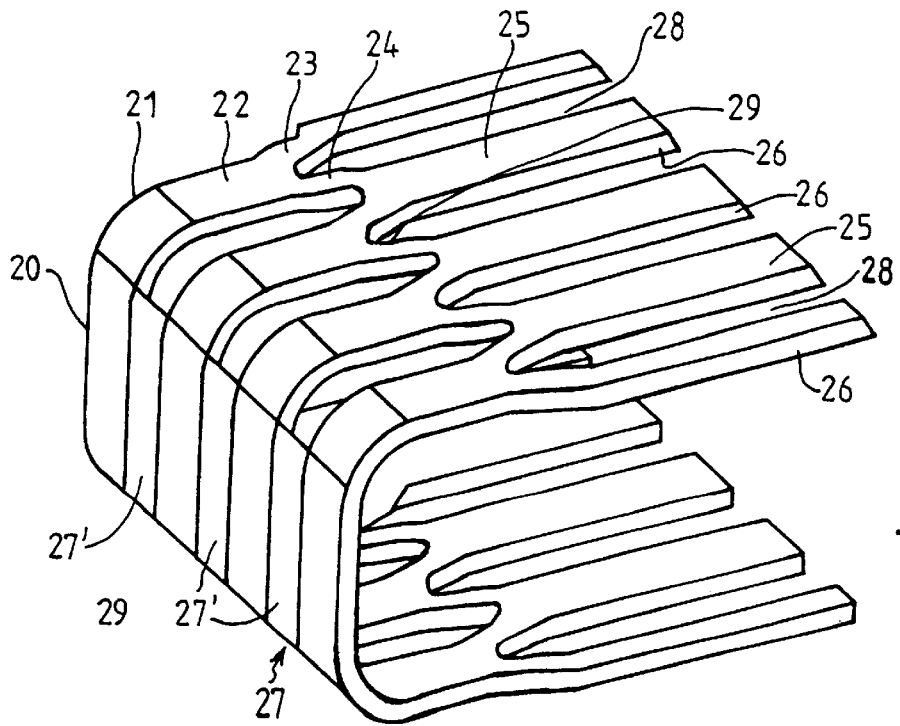
FIG. 3a is a perspective view of reinforcement corresponding to French patent No. 2 661 972 in the name of the Applicant.
Figure 3B:
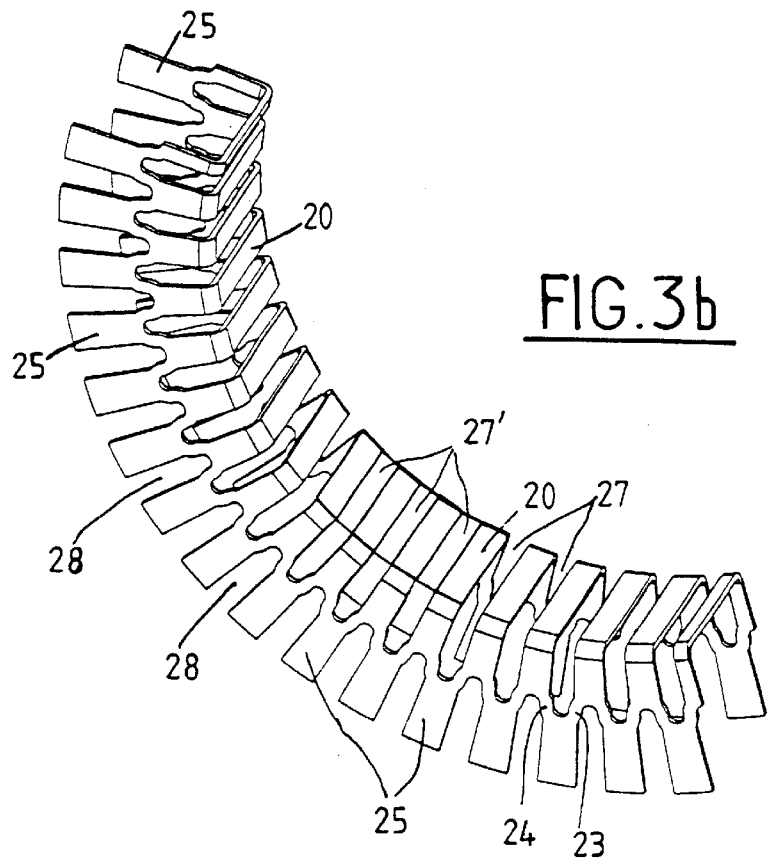
FIG. 3b shows the same reinforcement when curved.

The section member shown in FIGS. 3a and 3b and suitable for being manufactured by the method of the invention has a channel-shaped section with solid bars separated by open portions 27 of closed outline. The ends of the solid bars 20 are extended by rounded portions at 90° and then by branches 23 which split into two secondary branches 23 and 24 each uniting with one of the two adjacent end branches 25 set off therefrom by an open portion 26 of open outline. At the secondary branches 23 and 24, the open portions 27 and 28 are terminated by ends 29 like the fingers of a glove. In the dorsal region of the gasket, the open portions 27 can have webs 27' analogous to the webs 19'. As before, they are shown on a fraction only of the length of the section member.

In the context of the present invention, the end branches 25 have reentrant side edges 26 sloping at 45°, for example, thus making it easier, as described above, to manufacture and in particular to "unmold" the reinforcement from the wheels or the pads.

Figure 4A:
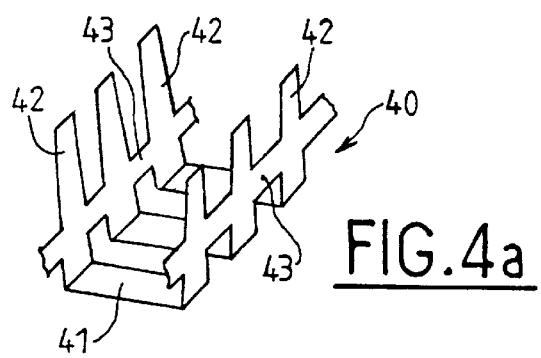
FIGS. 4a, 4b, 5a, 5b, and 6 show other kinds of reinforcement which can be made using the method of the invention.
Figure 4B:
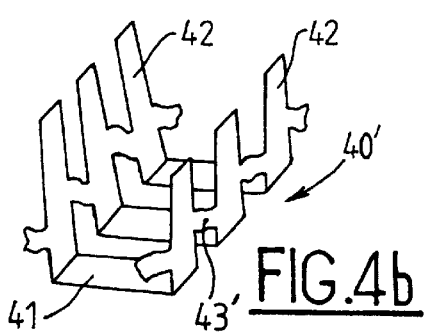

The reinforcement 40 shown in FIG. 4a is made up of U-shaped pieces 42 interconnected by bridge regions 43 situated between the branches 42 of successive U-shaped pieces. The reinforcement 40' shown in FIG. 4b is substantially identical to the reinforcement 40 except that the bridge regions 43' are sloping.

Figure 5A:
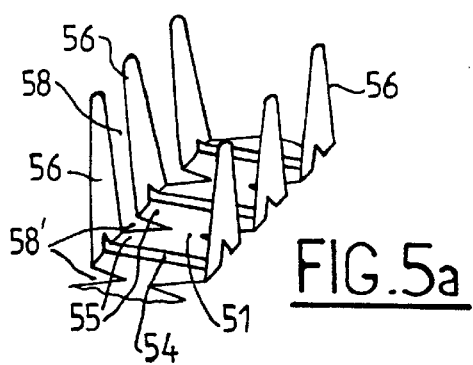
Figure 5B:
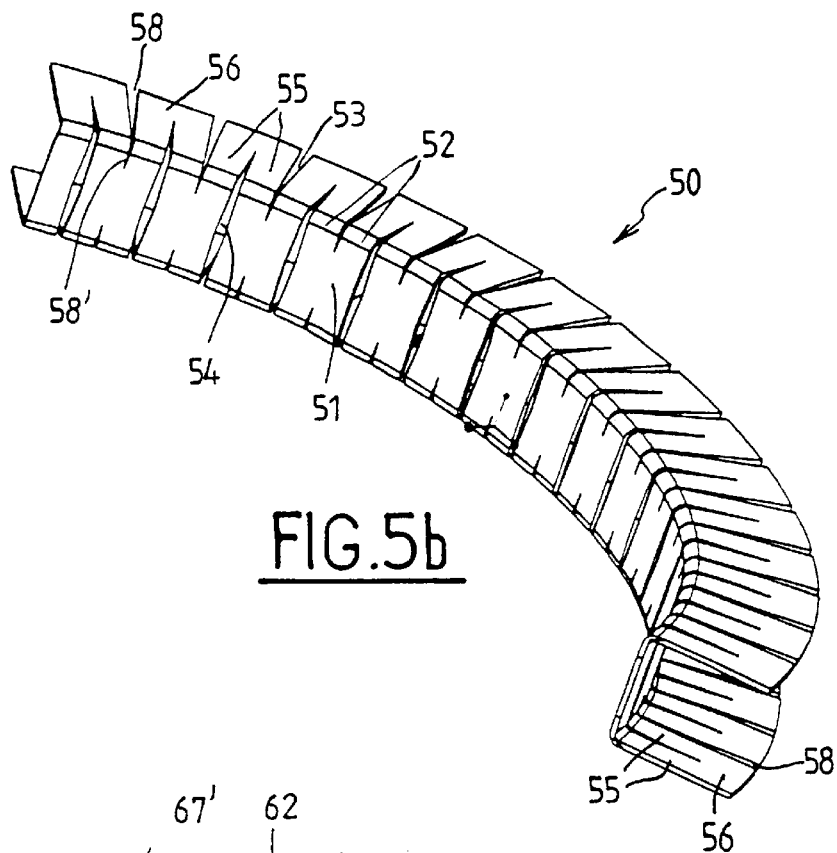

The reinforcement 50 shown in FIGS. 5a and 5b has central regions 51 separated from one another by slots 54 and connected to branches 56 by arms 55. The branches 56 are separated from one another by slots 58 which are terminated by triangular extensions 58' between the arms 55. Each branch 56 is thus connected by two arms 55 to two adjacent central regions 51.

The gaskets of FIGS. 4a, 5a, and 5b can also have web regions (not shown, but situated in their dorsal regions), which web regions are a by-product of the calendering, as before.

Figure 6:
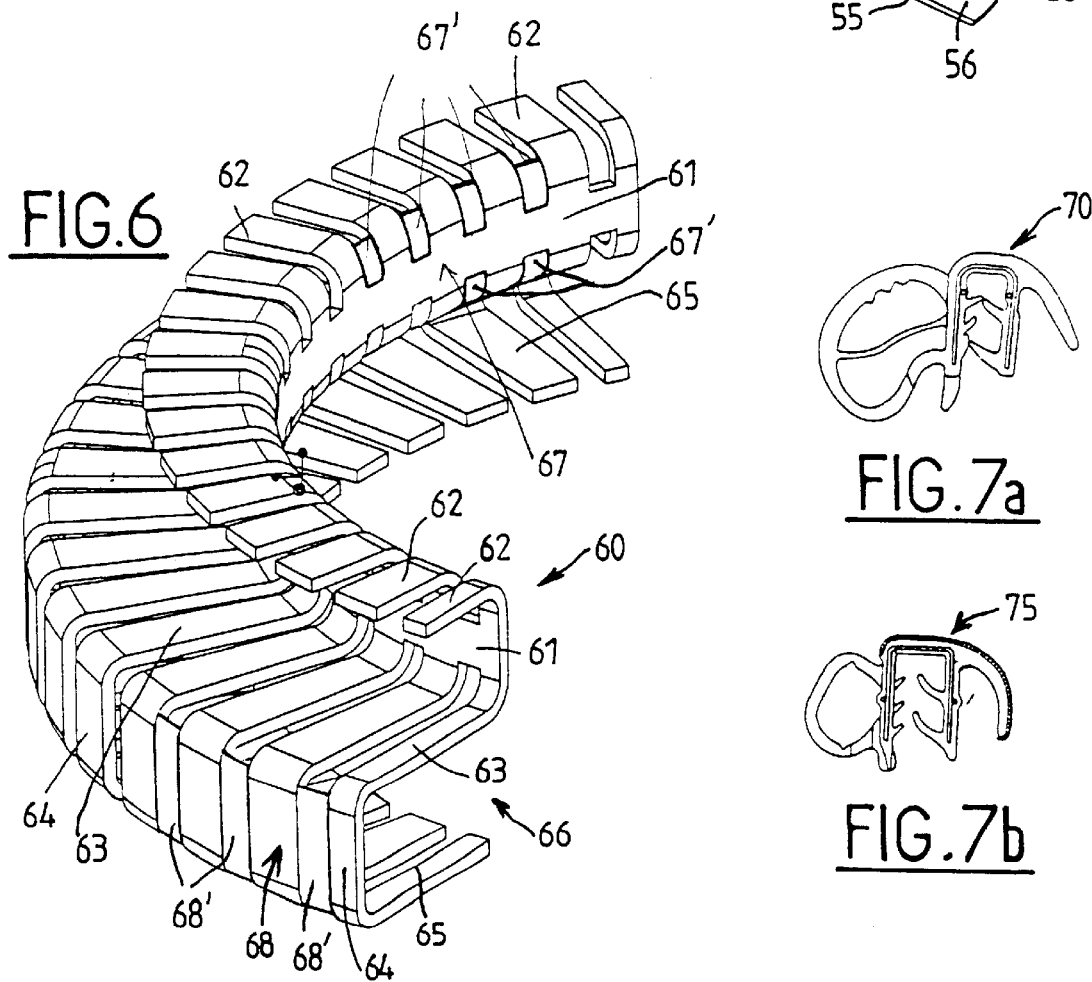

The reinforcement 60 shown in FIG. 6 has a longitudinal spine 61 with fingers 62 on one side with U-shaped fingers 66 on the other side (each U-shape comprising portions 63, 64, and 65). This reinforcement thus has an S-shaped section with two spines (67, 68) optionally provided with webs 67' and/or 68'.

It can thus be seen that the method of the invention makes it possible to manufacture a very wide variety of types of reinforcement.

Figure 7A:
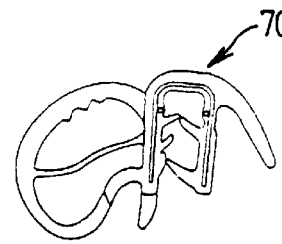
FIGS. 7a and 7b are section views showing two examples of door gaskets for motor vehicles including reinforcement as manufactured using the method of the invention.
Figure 7B:
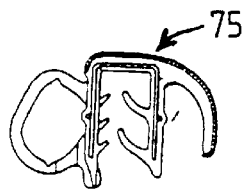

The reinforcement can be used in particular to make door gaskets for motor vehicles, e.g. 70 (FIG. 7a) or 75 (FIG. 7b) where advantage is taken of their suitability for being curved.

Figure 8:
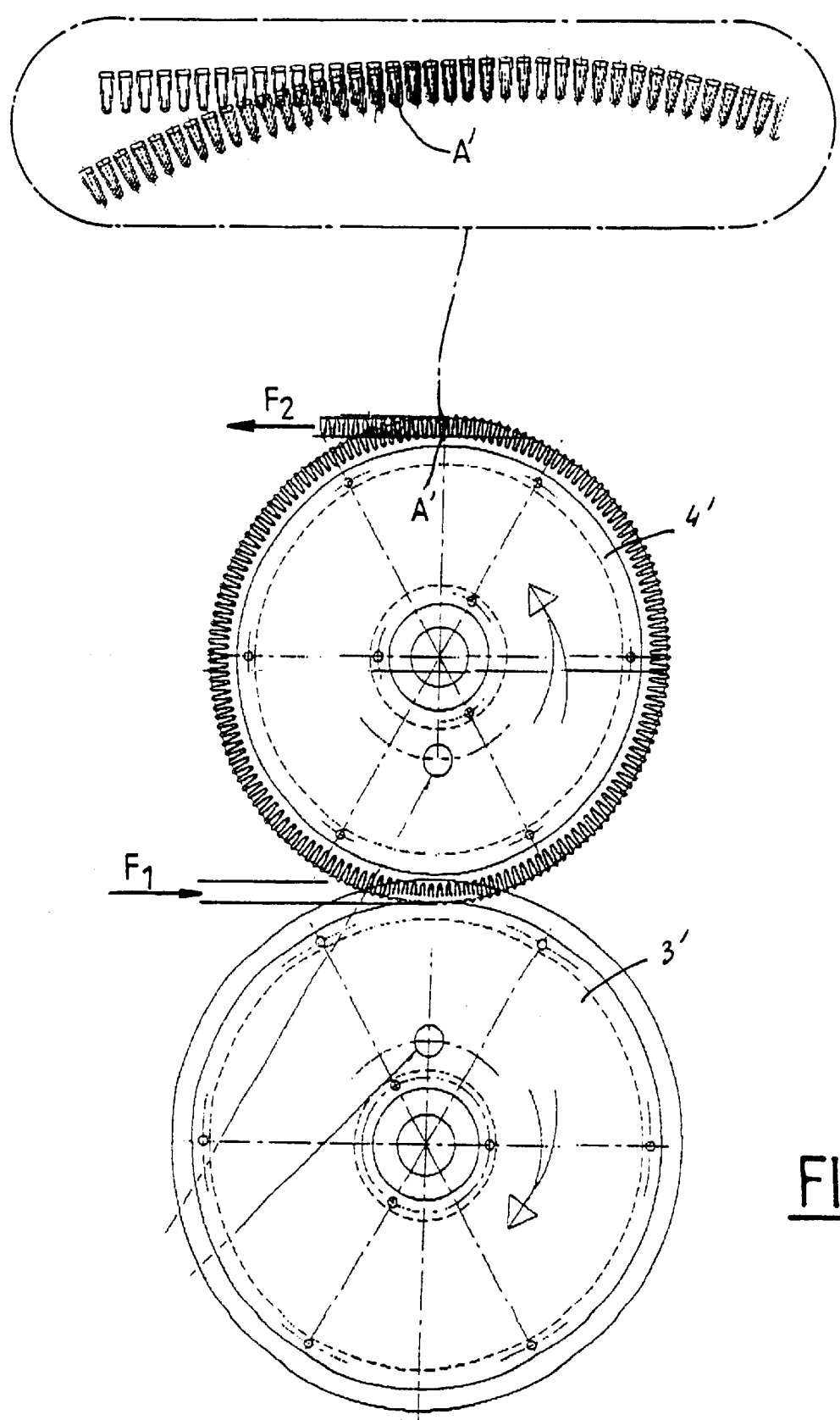
FIG. 8 shows a variant of the FIG. 1 apparatus.

FIG. 8 shows a variant of the FIG. 1 apparatus in which the extruded bead (or preform) 2 is inserted horizontally in the direction of arrow $F_1$ between two wheels 3' and 4', and after calendering leaves the wheels tangentially at a point A' in the direction $F_2$ which is opposite to $F_1$, after following a half-turn around the wheel 4.

What is claimed is:

1. A method of manufacturing a curveable reinforcement of a type presenting a pattern comprising solid portions and open portions and intended for use in making a reinforced sealing section member, the method comprising:

a) extruding a bead or preform of thermoplastic material; and b) calendering the extruded bead or preform of thermoplastic material with a calender wheel that is patterned with the negative of said pattern to impart to the extruded bead or preform said pattern with solid portions and open portions and wherein at least part of the open portions present remaining web portions of said the thermoplastic material that are thin relative to the solid portions and that form bridges between the solid portions.

2. A method according to claim 1, comprising:

c) cooling the calendered bead or perform.

3. A method according to claim 2, wherein said cooling is accompanied by a calibration operation.

4. A method according to claim 1, wherein the curveable reinforcement presents a section that is U-shaped, V-shaped S-shaped, L-shaped, or W-shaped.

5. A method according to claim 1, wherein the calendering is performed between at least two wheels, at least one of which presents recessed imprints in the shape of said pattern, which wheels are driven to rotate simultaneously.

6. A method according to claim 5, wherein at least one of the wheels is cooled internally.

7. A method according to claim 1, wherein the calendering is preformed by means of a pulling caterpillar having N pairs of shapes presenting imprints in the shape of said pattern.

8. A method according to claim 7, wherein the pulling caterpillar presents a developed length equal to the length of the reinforced sealing section member to be made, or to a multiple of the length of the reinforced sealing section member.

9. A method according to claim 8, wherein the imprints in the pulling caterpillar present variations as a function of an abscissa extending lengthwise of the curveable reinforcement so as to cause the reinforced sealing section member and thus at least one property of the curveable reinforcement to vary as a function of said abscissa.

10. A method according to claim 1, wherein the curveable reinforcement has end branches with side edges that slope so as to form tapers.

11. A method according to claim 1, wherein, in order to make a reinforced sealing section member, the method further comprises:

d) extruding a flexible covering layer of elastomer or of a thermoplastic material to cover the curveable reinforcement.

12. A method according to claim 11, wherein the material of the curveable reinforcement and the material of the flexible covering layer are selected, respectively, from: rigid PVC & flexible PVC; PP& PP-EPDM or SEBS; ABS & SEBS; PVC-ABS & flexible PVC; and PMMA & SEBS.

13. A method according to claim 11, implementing coextrusion of an intermediate layer and of the flexible covering layer, the intermediate layer being of a material that is suitable for adhering both the material of the curveable reinforcement and to the flexible covering layer between which it is interposed.

14. A method according to claim 13, wherein the intermediate layer is selected from ethylene vinyl acetate copolymers or ethylene-acrylic ester copolymers.

15. A method according to claim 13, wherein the curveable reinforcement is made of polyamide, the intermediate layer of maleic anhydride grafted epoxy, and wherein the flexible covering layer is made of EPDM.

16. A method according to claim 1, wherein the curveable reinforcement has a dorsal region extending lengthwise of the curveable reinforcement, and said web portions are positioned at least on said dorsal region.

* * * * *